June 30, 1953     H. D. LATHROP     2,643,530
SAFETY DRIVE CLUTCH
Filed Dec. 21, 1950
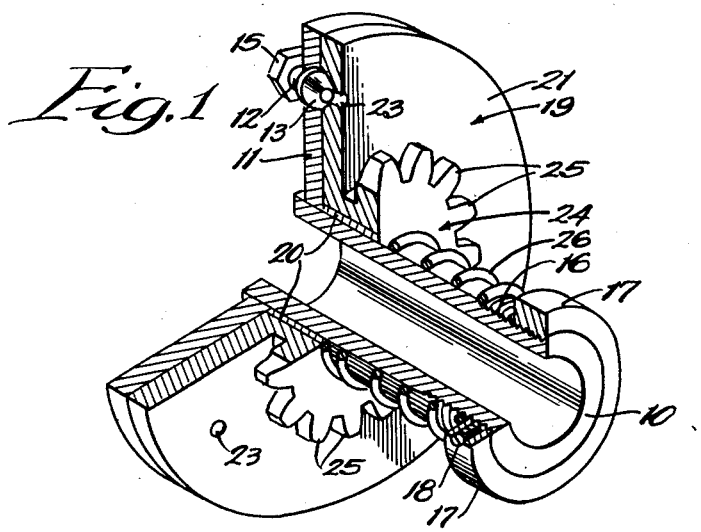
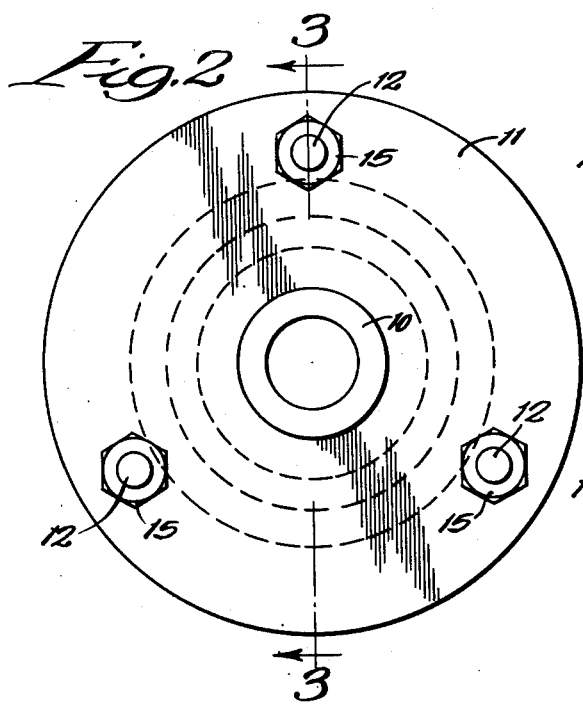
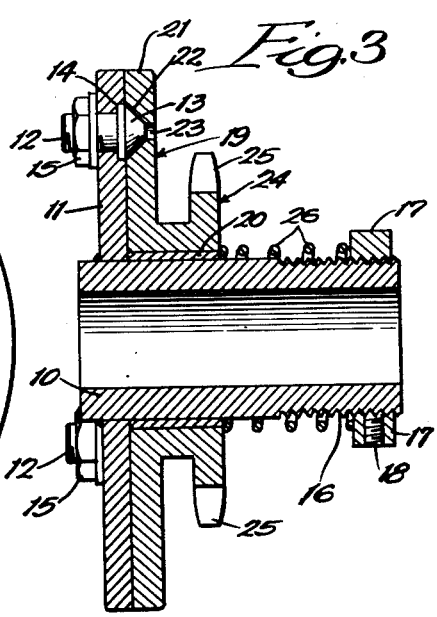
INVENTOR:
Harry D. Lathrop,
BY
Dawson & Ormes,
ATTORNEYS.

Patented June 30, 1953

2,643,530

UNITED STATES PATENT OFFICE 2,643,530

SAFETY DRIVE CLUTCH

Harry D. Lathrop, Chicago, Ill., assignor to The Lathrop-Paulson Company, Chicago, Ill., a corporation of Illinois Application December 21, 1950, Serial No. 202,008

3 Claims. (Cl. 64—29)

This invention relates to a safety drive clutch.

In the operation of many types of machines such as, for example, a milk can washing machine, situations occur when it is desirable for the operator to stop the machine quickly from different points about the machine. This stoppage is necessary often to protect the operator from injury and sometimes for other reasons it becomes important to stop the main operating part of the machine while permitting the motor and the driving members to continue operating. Further, in a machine of this type and many other types it is essential that the clutch structure, which permits this result to be accomplished, be arranged in a very compact form so as to present no obstruction, etc.

An object of the present invention is to provide a safety drive clutch bringing about the above-mentioned results. A further object is to provide a drive clutch structure of compact arrangement whereby the power is transmitted through a sprocket to clutch plates, the sprocket being supported by a compression spring engaging a collar on the drive shaft. Other specific objects and advantages will appear as the specification proceeds.

The invention is shown, in an illustrative embodiment, by the accompanying drawing, in which—

Fig. 1 is a perspective view of the drive clutch structure, the structure being shown in section; Fig. 2, a front view in elevation; and Fig. 3, a longitudinal sectional view, the section being taken as indicated at line 3—3 of Fig. 2.

In the illustration given, 10 designates a driven hollow shaft upon which are mounted parts of the machine which are to be operated. Fixed to the end of shaft 10 is a clutch plate 11 apertured at three places to receive the bolts 12. The bolts 12 are provided at their inner ends with drive studs 13 which are frustro-conical in shape and which are received within enlarged recesses 14 of plate 11. The drive studs 13 are anchored securely in position by nuts 15 which engage the outer threaded ends of the bolts 12.

The hollow shaft 10 is provided at its outer end with a threaded portion 16. A threaded collar 17 is adjustably mounted upon the threaded portion 16 and is secured in any adjusted position by a set screw 18.

A drive clutch member 19 is provided with an annular bearing 20 mounted upon the shaft 10, as shown more clearly in Fig. 3. Integrally formed with the member 19 at its outer side is a clutch plate 21 having recesses 22 receiving the drive studs 13 of plate 11. I prefer to provide the plate 21 with apertures 23 aligned with the stud-engaging recesses 21. Integrally formed with the inner end of the member 19 and extending outwardly therefrom is a sprocket disc 24 provided at its outer end with teeth 25.

A compression spring 26 lies between the collar 17 on shaft 10 and the inner face of the disc 24 extending below the teeth 25.

Operation

In the operation of the safety drive clutch, the parts are assembled in the order illustrated best in Fig. 3. The drive motor through a chain (not shown) drives the sprocket 24 and causes the entire member 19 to rotate therewith upon shaft 10. If a driven part connected with shaft 10 is held, the conical faces of the drive studs 13 ride out of the recesses 22 of plate 21, thus causing the member 19 to be shifted rearwardly against the spring 26. Once out of the recesses, the studs 13 move easily over the face of the plate 19 until they engage the next recesses 22. If the held part carried by shaft 10 is still prevented from rotating, the drive studs 13 will move out of the next recesses and the operation will continue until the part is released.

Upon release of the held part, the drive studs 13 will, upon entering the next recesses, cause the two plates 11 and 21 to rotate together and shaft 10 with the machine parts thereon will continue rotation.

The collar 17 is preferably adjusted to cause the normal power required for operating shaft 10 to be transmitted through the clutch plates, but permitting the clutch plates to separate when one of the driven parts on member 10 are held against rotation and a greater load thus placed upon the spring 26.

The collar 17 mounted on shaft 10 supports the spring 26 closely about shaft 10 and in line with the inner portion of the sprocket disc 24.

By employing three openings or recesses 22, which are spaced apart on the plate 21, it is found that effective driving of the parts takes place, while at the same time, when it is desired to stop a driven part, the well spaced-apart recesses permit relative movement of the parts before engagement again takes place. By providing a sprocket disc of substantially lesser diameter than the drive plate 21, the plate 21 serves as a guard for the chain which follows the lateral movement of the member 19 in the plate-engaging and disengaging operations.

The drive structure is extremely compact while at the same time permitting ready disengagement when this is desired for safety reasons, while then again automatically reengaging the parts after the need for disengagement has passed. The flat outer end of the conical stud or head 13 rides easily upon the smooth outer surface of plate 21 when the studs are out of their respective recesses and during this interval the operator can make adjustments and changes in the machine itself before the studs 13 again engage recesses in the plate 21.

While in the foregoing specification I have set forth a specific structure in considerable detail for the purpose of illustrating an embodiment of my invention, it will be understood that such details of structure may be varied widely by those skilled in the art without departing from the spirit of my invention.

I claim:

1. In a safety drive clutch, a shaft, a clutch plate fixed thereon at one end and a collar secured to the shaft in spaced relation to said plate, a sleeve having at one end thereof a clutch plate and at the other end an outwardly-extending sprocket disc, said plates having their adjacent faces provided with interlocking studs and recesses having complementary-inclined walls, and a compression spring between said collar and said sprocket disc for urging said studs into engagement with said recesses, said studs having frustro-conical heads with flat outer surfaces said sprocket disc being of considerably smaller diameter than said second-mentioned clutch plate and being closely spaced thereto, whereby said second-mentioned clutch plate serves as a guard for said sprocket disc.

2. In a safety drive clutch, a shaft, a clutch plate carried by the outer end of said shaft, said shaft having an exteriorly-threaded portion over an area spaced from said plate, a collar adjustably mounted upon said threaded portion of said shaft, a sleeve member slidably mounted upon said shaft and having integrally formed with its outer end a clutch plate adapted to abut the inner face of said first-mentioned plate, said sleeve having integrally formed with its inner portion an outwardly-extending sprocket disc, one of said plates being provided with three uniformly spaced studs having rounded inner surfaces and the other of said plates being provided with three recesses provided with walls complementary to the contour of said studs, and a compression spring mounted upon said shaft and engaging at one end said collar and at the other said sprocket disc, said sprocket disc being of considerably smaller diameter than said second-mentioned clutch plate and being closely spaced thereto, whereby said second-mentioned clutch serves as a guard for said sprocket disc.

3. In a safety drive clutch, a hollow shaft equipped at its outer end with a clutch plate, said clutch plate being apertured at three equally-spaced points, bolts extending through said apertures and having outer threaded ends engaged by nuts, the inner ends of said bolts being provided with stud heads having frustro-conical faces, a collar mounted upon said shaft and spaced inwardly from said plate, a sleeve member mounted upon said shaft between said collar and plate and having a plate adapted to abut said first-mentioned plate, said last-mentioned plate having recesses extending therethrough and provided with inclined sets receiving said stud faces, said sleeve being provided at its end with an outwardly-extending sprocket, and a compression spring engaging said collar at one end and at its other end urging said sprocket and plate connected threwith towards said first-mentioned plate said sprocket being of considerably smaller diameter than said last-mentioned plate and being closely spaced thereto, whereby said last-mentioned plate serves as a guard for said sprocket.

HARRY D. LATHROP.

References Cited in the file of this patent

UNITED STATES PATENTS

| Number | Name | Date |
|---|---|---|
| 1,496,059 | Lanzetta | June 3, 1924 |
| 2,062,593 | McCloud | Dec. 1, 1936 |
| 2,561,136 | Richardson | July 17, 1951 |

FOREIGN PATENTS

| Number | Country | Date |
|---|---|---|
| 127,842 | Switzerland | 1928 |